Figure 3:
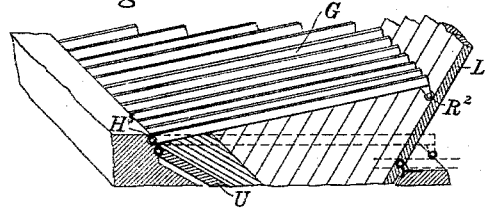

(No Model.)  4 Sheets—Sheet 1.

W. L. MARSHALL.
AUTOMATIC DAM, GATE, OR WEIR.

No. 596,755.  Patented Jan. 4, 1898.

WITNESSES:  INVENTOR
Henry Jewey  William L. Marshall (No Model.) 4 Sheets—Sheet 2.

W. L. MARSHALL.
AUTOMATIC DAM, GATE, OR WEIR.

No. 596,755. Patented Jan. 4, 1898.

WITNESSES: INVENTOR
William L. Marshall

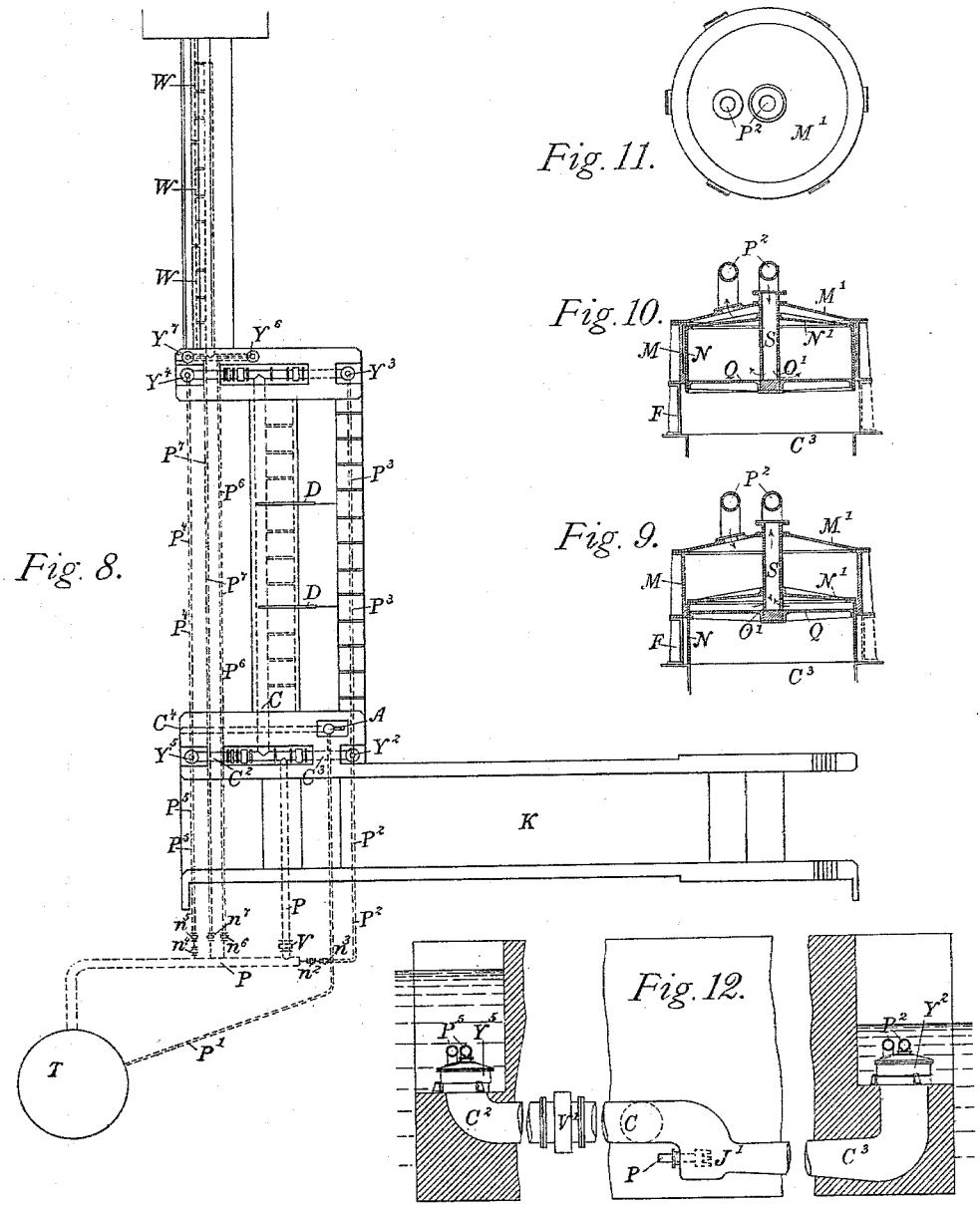

(No Model.) 4 Sheets—Sheet 4.
W. L. MARSHALL.
AUTOMATIC DAM, GATE, OR WEIR.
No. 596,755. Patented Jan. 4, 1898.
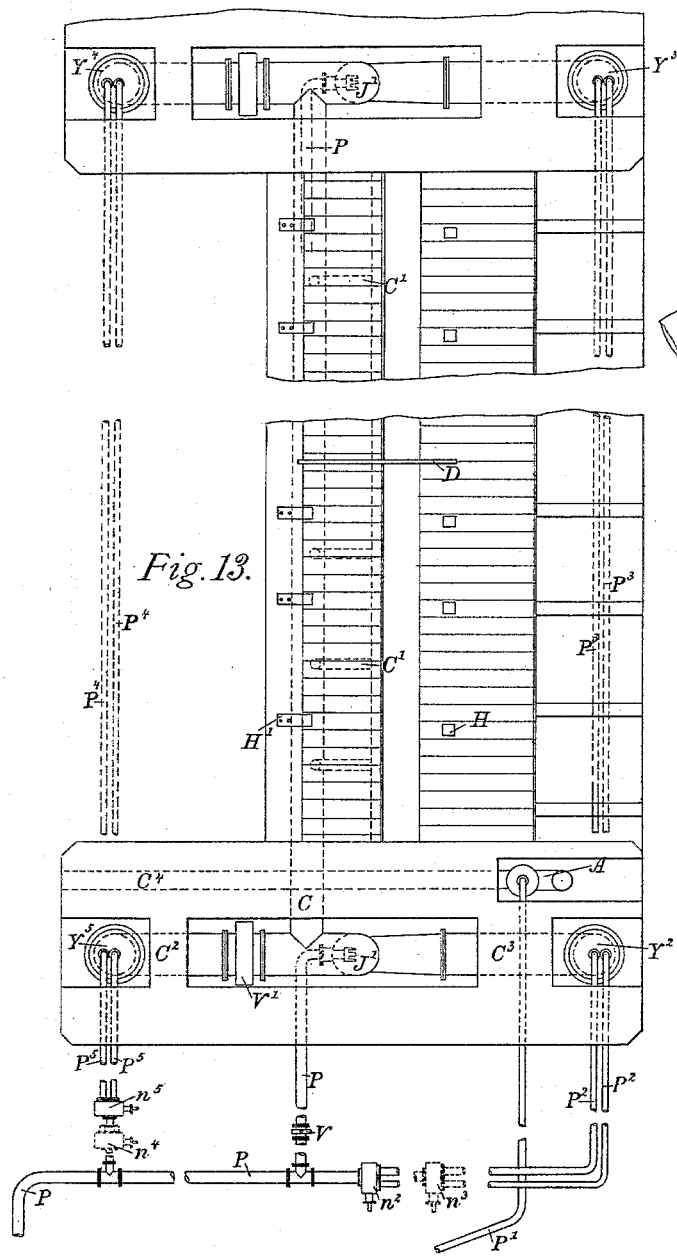
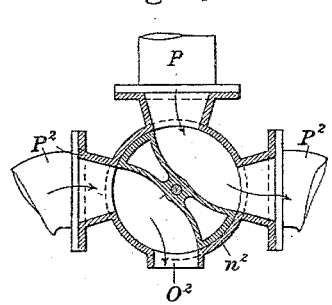
Fig. 14.
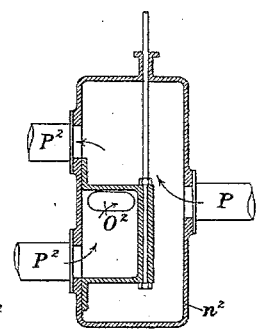
Fig. 15.
WITNESSES:
INVENTOR
Wm L. Marshall

UNITED STATES PATENT OFFICE.

WILLIAM L. MARSHALL, OF CHICAGO, ILLINOIS.

AUTOMATIC DAM, GATE, OR WEIR.

SPECIFICATION forming part of Letters Patent No. 596,755, dated January 4, 1898.

Application filed March 17, 1897. Serial No. 627,967. (No model.)

*To all whom it may concern:*

Be it known that I, WILLIAM L. MARSHALL, a resident of Chicago, in the county of Cook, State of Illinois, have invented a new and Improved Automatic Dam, Gate, or Weir, of which the following is a full, clear, and exact description.

The object of the invention is to provide an automatic but perfectly controllable dam, gate, or weir of any desired length of crest that may control the levels of a river, reservoir, or canal for purposes of navigation or water-supply, or to prevent disaster by flood, while at the same time maintaining the required levels above said dam or gate, and also to provide means for operating said dam or gate by utilizing the potential or weight inherent in the water of the stream itself and in the atmosphere above the surface of the water.

The invention consists in a dam or gate with two leaves arranged as a compound lever, in connection with an inclined plane, (fixed or movable,) the common line of application of the levers being above a hydraulic chamber from which the water is pressed or abstracted to raise the gate by calling into action the superincumbent weight of water and atmosphere overlying the hydraulic chamber and common line of application of the levers, and into which chamber water is sucked, pressed, or admitted to lower the dam or gate by calling into action a preponderating force on the projecting surface of the downstream leaf forming the dam or gate.

The invention is related to that class of hydraulic structures commonly denominated "bear-trap" dams; but it will be noticed that it differs in essential particulars from this class of dams in that atmospheric is as essential as hydraulic pressure in operating its various forms; that all working pressures are exerted on the outside of the so-called "hydraulic" chambers, directed inward, except in the special case where a latching or locking of the gate is concerned; that the dam may consist in separate parts or units with intervening piers or partitions closing the ends of the hydraulic chambers of the units and projected downward below the bottom of the river, pass, or weir instead of upward, as in the case of the known forms; that all forces acting on the dam are directed downward, not upward; that hinges therefore become of secondary importance, since all surfaces at hinges are compressed into close contact instead of forced apart, as in known forms, and that when the dam or gate is raised the line of junction or contact between the leaves is at or near the bottom instead of near the top of the dam, &c., as in old types.

The forms now described as new differ from the old types in the fact that where in the old types an actual transfer of water into the hydraulic chamber and to the point of application of its weight or pressure is required antecedent to the motion of the gate to continue the motion in the new forms pressure is transmitted instantaneously by the disturbance of a preëxisting equilibrium of forces, and the transfer of matter into and out of the hydraulic chamber is the consequence and not the primary cause of motion. As a result of this fact the pressures on the gates under same conditions are absolutely uniform for similar areas or relative positions corresponding to equal potential in the working forces, and there can be no tendency to warp or twist the leaves of a properly-constructed gate or dam except from some unequal resistance—as in friction, for instance. The transfer of pressures in the new types is instantaneous, but the transfer of matter or mass producing pressure in old forms requires time as an element.

These inventions then are the inverse in both form and principle of the old types, and are therefore named "inverted bear-trap" dams. All known forms may be inverted in accord with this invention.

The invention also consists in certain new and useful parts, combinations, and details necessary or advisable for the successful and easy operation of the dam or gate, as hereinafter shown.

Reference is to be had to the accompanying drawings, in which similar letters refer to similar parts in all the figures.

Figure 2:
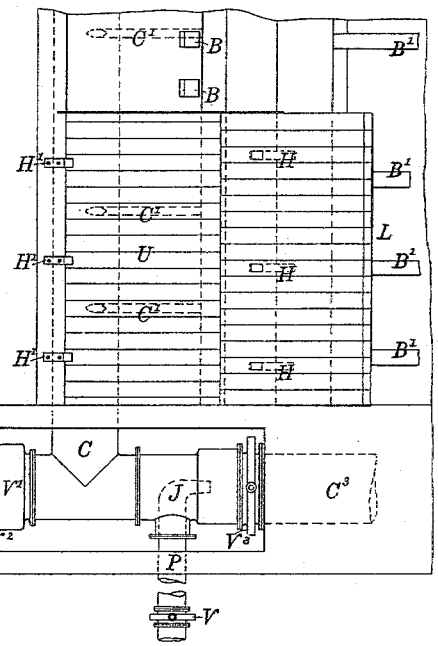
Figure 1:
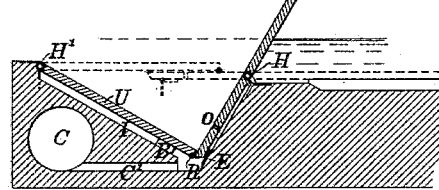
Figure 4:
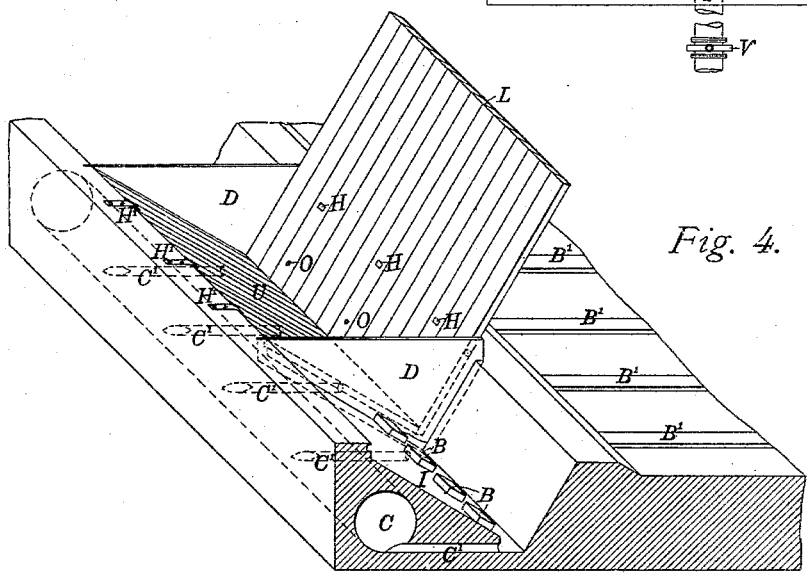
Figure 7:
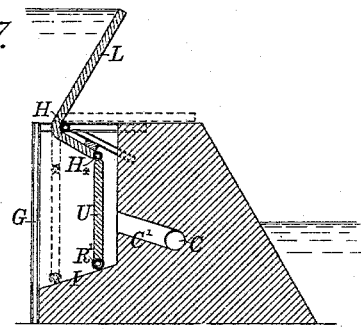
Figure 6:
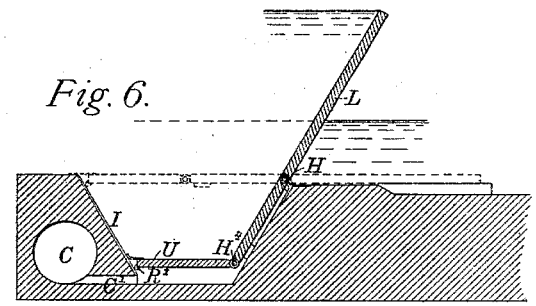
Figure 5:
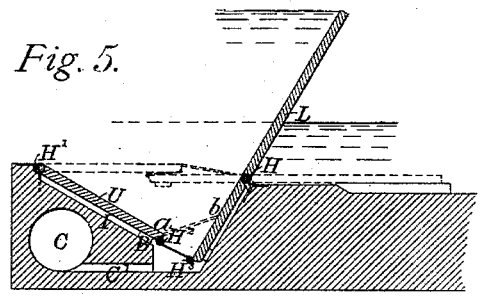

Figure 1 is a section, Fig. 2 a plan, and Fig. 4 an isometric view of one form of the invention. Fig. 3 is an isometric view showing drift shield or cover. Figs. 5 and 6 are sections showing modified forms of the invention. Fig. 7 is a section showing a modification of form shown in section in Fig. 6 to adapt it to raised weirs. Fig. 8 shows in small scale in plan the general arrangement of the invention when applied to a lock, navigable pass, dam, or weir, the details being shown on large scale in other figures. Figs. 9 and 10 are sections showing the cylindrical valves open and closed, respectively; Fig. 11, a plan of the valve; Fig. 12, a section of abutment parallel to axis of cross-conduit and elevation of said conduit, showing relation between valves, conduits, and jet-ejector at either end of dam shown on Fig. 8 and enlarged on Fig. 13. Fig. 13 is an enlarged plan showing details at one end of the dam shown on Fig. 8 and in further detail in other figures. Figs. 14 and 15 show in section one each of many well-known forms of four-way cocks and slide-valves that may be used at points lettered $n$ on Fig. 8 for control of water-pressures operating the valves shown in Figs. 8, 9, 10, 11, and 12.

Referring now to Figs. 1, 2, and 4, the dam of this form consists in a downstream leaf L, hinged to the foundation at hinges H H, near the center of fluid-pressure on this leaf, forming a cantaliver, and an upstream leaf hinged to foundation at hinges H' H', the free edge of this leaf riding on surface of downstream leaf upstream from hinges H H. The two leaves form thus a compound lever, and the surface of downstream leaf on which the free edge of upstream leaf travels on rollers R or otherwise when gate is in motion constitutes a movable inclined plane and mechanically acts as such. The space below the gate and between the hinges or supports of the leaves is called the "hydraulic" chamber.

C is the main conduit, forming the channel of ingress and egress of water to and from the hydraulic chamber through lesser conduits C' C' at regular intervals.

$C^2$ $C^3$ is a cross-supply conduit, connected with main conduit C and upper pool through valve $V^2$ and check-valve V', which prevents back pressure upstream and with lower pool through valve $V^3$.

P is a pipe connected with an auxiliary reservoir of water communicating through valve V and nozzle J with cross-conduit $C^2$ $C^3$, the nozzle arranged to project a jet of water coincident with the axis of conduit $C^3$ and downstream. This nozzle J is shown as a single jet. When the conduits C $C^2$ $C^3$ are large, this injector may be a gang-jet or gang of jets, as shown at J', Fig. 12, so arranged as to uniformly sweep through the cross-sectional area of conduit C. The injector J may be replaced by a pump; but in any case the conduits C $C^2$ $C^3$, as well as minor conduits C', must be air-tight to serve as suction-pipes to transmit atmospheric pressure, and the valves pertaining to these conduits must be close-fitting.

B and B' are blocks supporting the gates in final position.

O O are small openings in downstream leaf to allow escape and ingress of water from and into the small space in hydraulic chamber under downstream leaf at beginning of lowering and end of raising gate.

E is a narrow leaf or flap to prevent water under pressure passing into this small space.

D D are diaphragms or partitions separating contiguous parts or units of dam or gate and dividing the hydraulic chamber into corresponding parts. Each part with its diaphragms or partitions at ends of same constitute a complete unit. In long dams there are several of these units or parts. This form is not useful where a head accumulates before gate is entirely raised, as shown in Fig. 1. It is applicable to lock-gates and to situations where the dam or gate is to be raised in still or nearly still water.

Fig. 3 is an isometric drawing of a drift-cover G, hinged to foundation at $H^5$ and riding on downstream leaf at $R^2$ to prevent heavy bodies—like water-logged timber, pebbles, or gravel—getting into pit between leaves when gate is raised. This cover may be plain, perforated, or grillaged, as required by character of drift. It is not essential, as material may readily be removed mechanically from this pit.

Fig. 5 is a section of a modified form of the invention, showing the upstream leaf in two parts, the downstream part $H^2$ $H^3$ hinged to the leaves respectively at $H^2$ and $H^3$. The drawing represents this intermediate leaf or part as a solid rolled double-bulb beam, the bulbs constituting the axes of rotation; but this part may be made of any material. $a\ b$ is an apron or cover to exclude small bodies from the angle $a$ $H^3$ $b$.

Fig. 6 shows in cross-section another modification of the invention in which the upstream leaf is hinged to downstream at $H^4$, the free edge of this leaf traveling along inclined plane I on rollers R', or otherwise. It differs from form shown in Fig. 1 in that the hinge in upstream leaf is movable and the inclined plane is fixed. Mechanically speaking, it is the same—a combined compound lever and inclined plane.

Fig. 7 shows in cross-section a modification of form shown in Fig. 6 to adapt it to raised weirs. It is mechanically the same as form shown in Fig. 6. In this form the cantaliver downstream leaf is bent at H and the upstream leaf is vertical. The form shown in Figs. 6 and 7 are the simplest of the useful forms of the invention and most generally applicable. The hydraulic chambers are, however, larger than in the other forms, and if the gate be locked in its raised position by deflecting the surface of the inclined plane I at or near R', Figs. 6 and 7, (deflection not shown,) until it is normal to the leaf U in its "dam-raised" position the dam cannot be in parts or units unless each part or unit is operated as an independent dam through an independent conduit, for if we attempted to lower a dam of these forms in several parts when locked through a single conduit the water-pressure required on the under side of the upstream leaf U to unlock the leaves would release the part or unit offering the least resistance, lower this unit, and then lose its force or head by water escaping between the free end of the upstream leaf U and the inclined plane I. It would then be impossible to lower the other units or parts of the dam unless the hydraulic chamber of each part in the "dam-lowered" position can be made to offer a resistance against an internal pressure outward. This is accomplished in the form shown in Fig. 5, where the upstream leaf is hinged to the foundation at H' and the two leaves hinged together by the bulb-iron $H^2 H^3$ forming, in connection with partitions, (shown at D, Fig. 4,) a water-tight hydraulic chamber for each unit or part of fixed volume when dam is down.

The form shown in Fig. 5 is the only known form of the invention where a dam in parts or units may be operated by a single supply pipe or conduit when the parts or units are locked when raised. It is the only form giving tight hydraulic chambers for each part or unit admitting continued internal pressure outward when the unit or part is depressed and no further movable under pressure, but it is much inferior to forms 6 and 7. The latter (6 and 7) are the most approved and useful forms.

Referring now to Figs. 8 and 13, T is an elevated tank supplied by the hydraulic ram A through pipe P'. P is a main pressure-pipe from reservoir T, communicating, through a gang of jets or gang-jet J', Figs. 12 and 13, controlled by valve V, with conduit $C^2 C^3$, which connects with upper and lower pools through valves $Y^5 Y^2$, of form shown in section in Figs. 9 and 10 and in plan in Fig. 11, as hereinafter described, and also with a continuous air-tight conduit C, extending the entire length of the dam D D and communicating with a second cross-conduit controlled by valves $Y^4 Y^3$ at the farther end of the dam and with the hydraulic chamber through minor air-tight conduits C', Fig. 1.

Since the conduits are to transmit atmospheric pressure or "suction" to and from the hydraulic chamber, it is necessary that they be air-tight, as well as water-tight, in order that the effects of the force may not be diminished by leakage. In the drawings the conduits are represented as calked pipes embedded in and surrounded by concrete. The valves $Y^2 Y^3 Y^4 Y^5$ are close-fitting and practically air-tight when closed.

W is a raised weir (shown in section in Fig. 7) provided with a cross and main conduit extending the length of the weir controlled by valves $Y^6 Y^7$ similar to $Y^2 Y^3$.

The valves $Y^2 Y^3 Y^4 Y^5 Y^6 Y^7$ are all as shown on Figs. 9, 10, and 11 and are operated by hydraulic pressure communicated through corresponding pairs of pipes $P^2 P^3 P^4 P^5 P^6 P^7$, connected with main pipe to reservoir P and controlled by corresponding slide valves or cocks at $n^2$, $n^3$, $n^4$, $n^5$, $n^6$, and $n^7$, which latter valves may be of any usual form of slide-valves or four-way cocks controlling reciprocating engines. Each valve lettered Y is controlled through a pair of pipes lettered P by means of a slide-valve, Fig. 15, or four-way cocks, Fig. 14, lettered $n^2$, by means of which valve or cock $n^2$ the water under pressure supplied through pipe P from reservoir is directed and controlled. Each set of pipes and valves has corresponding exponents to reference-letters to indicate the group or set. The water under pressure is supplied through pipe P and directed by slide valve or cock $n^2$, &c., the waste water passing to any desired lower level through openings $O^2$, Figs. 14 and 15. The directions of the pipes $P^2 P^3 P^4$, &c., are indicated on Fig. 8 by dotted lines, but the pipes themselves are not drawn in detail to avoid confusing the drawing, but these elements are shown in large scale on Fig. 13. The location and connections with the main pipe P to reservoir T are shown on Figs. 8 and 13.

The gates of the lock are of the same form as the dam, and each gate is provided with similar connections.

The dam is supposed to be of the form shown in Fig. 5. K is a lock provided with upper and lower gates of same construction as the dam and operated in the same manner. The connections are not shown for these lock-gates.

Fig. 9 shows a section of the valves $Y^2 Y^3 Y^4$, &c., closed; Fig. 10, a section with valve open; Fig. 11, a plan of the valve with its operating-pipes $P^2 P^2$, &c. Fig. 12 shows the relation of the valves and gang-jet J' to the conduits.

Each valve lettered Y, Figs. 9, 10, 11, 12, and 13, consists of a hydraulic press comprising the cylinder M, the cylinder head or dome M', through which one of the pipes $P^2$ communicates with a chamber of the press, a semidetached cylinder-head Q, connected with the opposite cylinder-head M' by a hollow fixed stem S and supported by it, through which stem the other pipe $P^2$ communicates with the lower chamber of the press at O', and an inverted cylindrical cup N' N sliding upon said stem S and guided by it, the top of which cylindrical piston N' constitutes the piston-head proper and the cylindrical part N constitutes the movable valve. The valve is applicable to the control of either inflow or outflow into or from the conduit controlled by it and is raised or lowered at will by the admission of water under pressure to one side of the piston-head, while on the other side of the piston-head is the exhaust or waste pipe.

All forms of this invention are operated by withdrawing water from the hydraulic chamber, which may cause parts of the gate above it to be pressed into this chamber *pari passu* with the withdrawal of water, thus raising the dam, and by admitting water into this chamber from the upper pool, thus equalizing pressures within and without the hydraulic chamber and so allowing the preponderance of pressure on the projecting part of the downstream leaf aided by the preponderance in weight to lower the gate to its horizontal position. This lowering movement produces a suction into the hydraulic chamber transmitted through the air-tight conduits, which accelerates the inflow by atmospheric pressure on the water without.

In all forms of the invention a preponderance of weight in water is given by construction to the downstream leaf downstream from the hinge H sufficient not only to keep the gate down, but also to counterbalance any sediment that is likely to accumulate on the parts of the system above the hydraulic chamber.

Whenever there is a sufficient fall or difference in level between the mouths of the inlet and outlet conduits $C^2$ $C^3$, Fig. 2, to furnish sufficient hydrostatic pressure to move the gates, they are raised by simply closing valve $V^2$ and opening valve $V^3$, allowing the water to flow into the lower pool under the influence of this hydrostatic head as modified by the weight of the gate, and they are lowered by closing valve $V^3$ and opening valve $V^2$. When such a difference of level does not exist at the dam, which is the general condition at movable dams in navigable rivers, an auxiliary working force is required to raise the dam at least until a sufficient head accumulates to complete the movement.

It is a main object of this invention to provide a simple means of developing a force far in excess of any possible requirements to be made upon it by converting the system into a hydraulic machine actuated by forces derived by accumulation from the natural forces in the stream and in the air that may be regulated and controlled as easily and with as much certainty as any great hydraulic engine.

The lock, dam, weir, reservoir, self-acting pump, valves, and conduits shown on Figs. 8 and 13 in plan and in section in previous figures and in Figs. 9, 10, 11, and 12 must be considered as necessary working parts of one machine designed for establishing navigation on and controlling the levels of a great river and capable of easy control and direction by one man and from a single point.

The lock, dam, and weir when there exists no sufficient initial head in the stream itself are operated in this manner. The elevated reservoir T is supposed to be full of water, the gates all flat in the bottom of the river, lock, and weir, and the valves all closed. The lock-gates are operated in the same manner as the dam, so the latter operation only will be given. To illustrate by an example: The dam is supposed to be twelve feet high, the conduits C $C^2$ $C^3$ to be four feet in diameter, and the ejector J', Fig. 12, to be a gang of twelve three-inch nozzles, or one nozzle to each square foot of area of pipe; the head furnished by the elevated reservoir thirty-six feet, giving a velocity of jet of forty-eight feet per second; the dam to be four hundred feet long, in three parts or units of one hundred and thirty-three feet each. The outlet-valve $Y^2$ is opened by setting slide-valve $n^2$ to proper position. The jets J' are turned on by opening valve V. These jets forcibly eject several times their volume of the water in front of them through valve $Y^2$, leaving an atmospheric vacuum continually forming, the effect of which is instantaneously transmitted through the conduits to the water in the hydraulic chamber, relieving the under sides of the gates overlying the hydraulic chamber from back pressure and at once calling into play the weight of the superincumbent water and of the air above the water to press the gates into the chamber as rapidly as this pressure can give motion to the water in the hydraulic chamber and to the mass moved by the downstream leaf in rising. By the action of the jets J', Fig. 12, alone the hydraulic chamber, under the laws of impact, will be emptied in about two minutes, corresponding to a motion at the crest of the dam of a little more than one and one-half inches per second, which is not excessive. By partly closing valve V the velocity through the ejectors J' may be diminished and the time of raising the dam extended. In about two minutes the jets will have discharged, under thirty-six feet head, about three thousand six hundred cubic feet of water, representing about four thousand feet tons of work, or at the rate of about one hundred and twelve horse-power.

The above approximate results are based on the supposition of simple pumping by the jets and that the water is ejected through $Y^2$, with four-fifths of its work, due its velocity and mass, unexpended, to be applied partly in developing heat, partly in relieving the back pressure of the atmosphere at the valve $Y^2$, and partly in giving motion to the water outside the conduit near this orifice; but actually the jets do a work of undermining a great weight superincumbent over the hydraulic chamber, thus inducing the action of a force constantly increasing in intensity and acting on constantly-diminishing masses of water within the hydraulic chamber, (which is simply a hydraulic brake or buffer,) so that the gates will rise with accelerated velocity if not restrained. This restraint may be applied by throttling the jets J', Fig. 12, using valve V, and by closing to any necessary extent the valve $Y^2$.

In practice such dams are moved at long intervals, so that a ram A or pump of very small capacity will restore to tank T the water used in this process. The dam having arrived at its full height, if of form shown in Fig. 5, will be locked in position and the valve V will then be closed, if it has not previously been closed, to allow the accumulated natural head to complete the work of raising the dam. In this position of the dam the inlet-valve $Y^5$ on one end of the conduit may be opened and the outlet-valve $Y^3$ at the other end and a current sent through the conduit C to clean it out at any time. To now raise the weir, when the upper pool rises so far as to flow over the fixed part of the weir the valve $Y^6$ is opened by setting the slide-valve $n^6$, the water in hydraulic chamber escapes into the lower level, and the upper pool presses the suspended trolley-leaf U, Fig. 7, into the hydraulic chamber and raises the weir to its full height. The operation then of raising a lock-gate, the entire dam, and the weir requires the manipulation of only five handvalves, namely: For the dam, the outlet-valve $Y^2$ by hand-valve $n^2$; the jet J' by hand-valve V; for the lock-gate, corresponding valves, (not shown,) and for weir the outlet-valve $Y^6$ by hand-valve $n^6$.

The valves $Y^4$ $Y^3$ are duplicates of valves $Y^5$ $Y^2$ and are reserved operating devices to be used either in flushing conduits C or in case of damage to $Y^5$ $Y^2$, or either of them, to supply an alternative operating set. They are substitutes, but may be used to double the action of $Y^5$ $Y^2$ and be provided with a duplicate of ejector J', Fig. 12, as shown on Fig. 13.

To lower the dam, close the valve $Y^2$, pertaining to the dam, by setting valve $n^2$. Open inlet-valve $Y^5$ by setting $n^5$. Open ejector-valve V. The back pressure from the jet will shut check-valve V', Fig. 2, and bring an upward pressure on bottom of leaf U in hydraulic chamber, which will release the lock. When the crest of the dam moves, close ejector-valve V and immediately the check-valve V' is automatically opened and water flows into the hydraulic chamber through valve $Y^5$ until the gate is down. If one section only of the gate should start, the ejector should be closed until that section is down and then again applied to release the other sections.

To lower the weir, close valve $Y^6$ by setting $n^6$. Open valve $Y^7$ by setting $n^7$. The weir will fall as hydraulic chamber is filled.

The locking of the dam when it is up is more interesting than useful. It allows a current to be sent through the conduits to clean them and the hydraulic chamber; but by considering the fact that the hydraulic chambers are of very small volume when the dam is raised and that when it is in communication with the lower pool that all leakage from the upper pool is projected with a considerable velocity into the small spaces under the gates and flows off freely through the conduits C $C^3$, carrying its sediment with it, there seems no advantage in locking the dam up. With a lock-gate it is of advantage in giving a feeling of security.

In operating a lock with these gates the filling and emptying of the locks are effected by spilling the water over the moving gate, so that filling and emptying valves are entirely unnecessary and the capacity of the lock is doubled by reducing the time required for a lockage. There are no projecting parts or machinery to be injured by floods carrying drift, so the lock may be constructed to become submerged as soon as it becomes no longer necessary for navigation.

When the dam or gate is not locked when up, all that is necessary in lowering it is to close the valve $Y^2$ and open $Y^5$ by setting valves $n^2$ and $n^5$.

I am aware that a storage-reservoir has been suggested heretofore to furnish a volume of water under a small head to fill or partly fill the hydraulic chambers of bear-trap dams and to furnish an initial head for raising the dam in slack water; but in my invention the elevated reservoir is for storing work or potential, not to store a volume of water to fill the hydraulic chambers directly. A volume of water is not in question, but there is in question the accumulation of the work of a small pump, to be afterward availed of as more concentrated work in pumping water out of or into the hydraulic chamber. The proposition therefore is not the same as heretofore proposed.

It is evident that if an elevated reservoir in connection with water-jets may be used for pumping out water from the hydraulic chamber the same arrangement, with direction of jet changed, may be used with other forms of hydraulic dams for pumping or injecting water from the river into hydraulic chambers with great diminution in volume of reservoirs necessary over what would be required in heretofore-known propositions. Consequently the arrangements shown in this specification and drawings of a self-acting pump, an elevated reservoir accumulating the work of said pump, water-jets, and controllable hydraulic combined presses and valves are applicable to all forms of hydraulic dams having hydraulic chambers. Such parts of the invention are of quite general application to automatic dams and weirs and not restricted to the special forms shown in the drawings herewith.

I am also aware that cylindrical or segmental valves and conduits extending the entire length of the dam have heretofore been proposed; but the particular cylindrical valves herein shown, the valve moving in the direction of the axis of the cylinder, (and not turning about the axis, like a cock,) and in close combination with a hydraulic press or motor it is believed has not been proposed or shown heretofore, nor has it been necessary in any known form of automatic dams to use air-tight continuous conduits; but they are essential to my invention.

Having thus fully described my invention, I claim as new and desire to secure by Letters Patent—

1. A movable dam, weir or gate, with two leaves, the line of contact or junction between which leaves is always at, or depressed below, the bottom of the river, pass or weir controlled by the dam, weir or gate.

2. A movable hydraulic dam, weir or gate with two leaves, and a pit or hydraulic chamber between the fixed supports of the two leaves, into which pit or chamber the line of contact between the leaves is projected in raising the dam, weir or gate, and from which it emerges in lowering the dam, weir or gate.

3. In combination with a rising-and-falling dam, weir or gate with two leaves actuated by water-pressure, a hydraulic chamber which always (whether the dam is up or down) is entirely below the bottom of the river, pass or weir controlled by the dam, gate or weir.

4. A dam, gate or weir of the class specified, with two leaves, elevated or raised by removing water from the hydraulic chamber, and depressed or lowered by filling the hydraulic chamber substantially as specified.

5. A rising-and-falling dam, gate or weir of the class specified, with two leaves, divided in its length of crest into two or more separate parts or units by vertical diaphragms or partitions at right angles to the crest of said dam, gate or weir, each of said diaphragms or partitions having its top at the bottom of the river, pass, or weir controlled by said dam, gate or weir and extending downward therefrom to below the lowermost part of said dam, gate or weir, said partitions closing or limiting the hydraulic chambers of said units or parts, substantially as specified.

6. In combination with a dam or gate of the class specified, and a drift shield or cover, resting upon or hinged to the foundation or bottom of the river, pass or weir, along a line upstream from the upstream leaf, extending over the upstream leaf and hydraulic chamber, and with its free end riding upon the downstream leaf at or near its hinged line, substantially as shown.

7. In combination with a rising-and-falling dam, gate or weir, of the class specified, with two leaves, a hydraulic chamber entirely below the bottom of the river, pass, or weir controlled by said gate, dam or weir, into and out of which chamber the lowermost parts of the gate move in action, the said hydraulic chamber being separated into parts by vertical partitions or diaphragms at right angles to the crest of said dam, gate or weir; the partitions separating parts or units of said dam, gate or weir substantially as described.

8. In combination with a dam or gate of the class specified, with two leaves and hydraulic chamber or chambers entirely below the bottom of the pass controlled by said dam or gate, an air-tight filling and emptying pipe or conduit extending the entire length of said dam or gate, communicating with said hydraulic chambers, and with water-levels above and below said dam or gate through air-tight conduits and close-fitting valves, substantially as specified.

9. In combination a dam, gate or weir of the class specified, an elevated reservoir of water, pipes or conduits controlled by valves leading from said reservoir to the supply-conduits, and nozzles or jet-pipes projected from said reservoir-pipes into a conduit or conduits controlling said gate, dam or weir, substantially as described.

10. In combination a dam, gate or weir of the class specified, a hydraulic pump or ram actuated by the head created by said dam or weir, an elevated reservoir for accumulating and storing the potential energy due to the water lifted by said ram or pump, pipes or conduits controlled by valves leading from said reservoir to the supply conduit and nozzles or jet-pipes projected from said reservoir-pipes into a conduit or conduits controlling said gate, weir or dam, substantially as described.

11. In combination a hydraulic dam, gate or reservoir, and controllable cylindrical valves, with movements parallel to the axes of the cylinders, actuated by the power created by said dam, gate or reservoir, controlling the hydraulic conduits pertaining to said gate, dam or reservoir, substantially as shown and specified.

12. In combination with a hydraulic dam, gate, weir or reservoir, combined cylindrical valves, and hydraulic presses or engines actuating said valves, controlling the operating-conduits of said gate, weir, dam or reservoir, each combined valve and press consisting in a cylinder with a dome or cylinder-head surmounting it, into and out of which cylinder the valve moves; a hollow piston-stem provided with ports communicating with one side of the piston and which stem is attached to the cylinder-heads and supports one of them; a movable cup-shaped cylinder, the top of which constitues the piston-head which moves along the fixed hollow piston-stem, the cylinder part of which cup constitutes the movable valve; a semidetached lower cylinder-head supported by the fixed piston-stem against the opposite cylinder-head or dome; legs or supports under said operating-cylinder or hydraulic press rigidly connected with it and with the conduit controlled by the valve; ports for waste and supply of water to and from the press actuating the valve, and pipe connections with the source of power, substantially as specified.

WILLIAM L. MARSHALL.

Witnesses:
HENRY JERVEY,
S. F. PEGUES.